(12) United States Patent
Lee et al.

(10) Patent No.: US 10,861,651 B2
(45) Date of Patent: Dec. 8, 2020

(54) MULTILAYER CAPACITOR

(71) Applicant: SAMSUNG ELECTRO-MECHANICS CO., LTD., Suwon-si (KR)

(72) Inventors: Jong Ho Lee, Suwon-si (KR); Duk Hyun Chun, Suwon-si (KR); Myung Jun Park, Suwon-si (KR); Eun Jin Kim, Suwon-si (KR); Hye Min Bang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 7 days.

(21) Appl. No.: 16/155,570

(22) Filed: Oct. 9, 2018

(65) Prior Publication Data

US 2019/0341190 A1    Nov. 7, 2019

(30) Foreign Application Priority Data

May 2, 2018    (KR) ........................ 10-2018-0050731

(51) Int. Cl.
*H01G 4/30* (2006.01)
*H01G 4/12* (2006.01)
*H01G 4/008* (2006.01)

(52) U.S. Cl.
CPC ............... *H01G 4/30* (2013.01); *H01G 4/008* (2013.01); *H01G 4/12* (2013.01)

(58) Field of Classification Search
CPC ...... H01G 4/248; H01G 4/012; H01G 4/1209; H01G 4/2325; H01G 4/30; H01G 4/0085; H01G 4/1227; H01G 4/008; H01G 4/12
See application file for complete search history.

(56) References Cited

U.S. PATENT DOCUMENTS

| | | | |
|---|---|---|---|
| 5,339,068 A | 8/1994 | Tsunoda et al. | |
| 2009/0190285 A1 | 7/2009 | Kusano et al. | |
| 2009/0290281 A1* | 11/2009 | Nagamoto | H01G 4/30 361/305 |
| 2014/0029157 A1* | 1/2014 | Kwag | H01G 4/232 361/301.4 |
| 2014/0347783 A1* | 11/2014 | Kisumi | H01G 4/012 361/301.4 |
| 2016/0212850 A1* | 7/2016 | Kainuma | H01G 4/232 |

FOREIGN PATENT DOCUMENTS

| | | |
|---|---|---|
| JP | 2001-223132 A | 8/2001 |
| JP | 3831497 B2 | 10/2006 |
| KR | 10-1994-0016309 A | 7/1994 |
| KR | 10-1099213 B1 | 12/2011 |
| KR | 10-2014-0014773 A | 2/2014 |
| KR | 10-2015-0127339 A | 11/2015 |

OTHER PUBLICATIONS

Office Action issued in corresponding Korean Application No. 10-2018-0050731, dated May 10, 2019.

* cited by examiner

*Primary Examiner* — Michael P McFadden
(74) *Attorney, Agent, or Firm* — Morgan, Lewis & Bockius LLP

(57) ABSTRACT

A multilayer capacitor includes a body including an internal electrode alternately disposed with a dielectric layer, and an external electrode disposed on the body. The external electrode includes a first electrode layer contacting the internal electrode, an oxide layer disposed on the first electrode layer and including a metal oxide and glass, and a second electrode layer disposed on the oxide layer.

10 Claims, 3 Drawing Sheets

MULTILAYER CAPACITOR

CROSS-REFERENCE TO RELATED APPLICATION(S)

This application claims the benefit of priority to Korean Patent Application No. 10-2018-0050731 filed on May 2, 2018 in the Korean Intellectual Property Office, the disclosure of which is incorporated herein by reference in its entirety.

BACKGROUND

1. Field

The present disclosure relates to a multilayer capacitor.

2. Description of Related Art

A multilayer ceramic capacitor (MLCC) is an important chip component used in industrial fields such as communications, computing, electronic appliance manufacturing, vehicle manufacturing, and others, as it is small-sized and is able to secure high capacity and be easily installed. A multilayer ceramic capacitor is also a core passive element used in a variety of electric devices, electronic devices, information communication devices such as cellular phones, computers, digital TVs, and the like.

A recent trend has been for multilayer ceramic capacitors to be miniaturized and high-powered as electronic devices have become miniaturized and high-powered. Accordingly, the importance of reliability of a multilayer ceramic capacitor has been increased, and in particular, the importance of moisture resistance reliability has increased.

To secure moisture resistance reliability of a multilayer ceramic capacitor, there have been attempts to improve moisture resistance reliability by forming a glass layer between electrode layers forming an external electrode.

However, there is a problem that weak coherence between a glass layer and an electrode layer may become a route through which moisture, and the like, can penetrate.

SUMMARY

An aspect of the present disclosure is to provide a multilayer capacitor having excellent moisture resistance reliability.

According to an aspect of the present disclosure, a multilayer capacitor is provided. The multilayer capacitor includes a body including an internal electrode alternately disposed with a dielectric layer, and an external electrode disposed on the body. The external electrode includes a first electrode layer contacting the internal electrode, an oxide layer disposed on the first electrode layer and including a metal oxide and glass, and a second electrode layer disposed on the oxide layer.

According to an exemplary embodiment, the thickness of the oxide layer may be within a range from 0.2 to 8 μm.

According to an exemplary embodiment, the content of a metal included in the oxide layer may be within a range of 10 to 80 wt %, based on a total weight of the oxide layer.

According to an exemplary embodiment, the first electrode layer may include Ni.

According to an exemplary embodiment, the second electrode layer may be a sintered electrode including a conductive metal and glass.

According to an exemplary embodiment, the conductive metal may be Cu.

According to an exemplary embodiment, the metal oxide may be a Ni oxide.

According to an exemplary embodiment, the first electrode layer may include Ni, the metal oxide may be Ni, and the second electrode layer may be a sintered electrode including Cu and glass.

According to an exemplary embodiment, the metal oxide may be an oxide of a metal contained in the first electrode layer.

According to an exemplary embodiment, a plating layer may be disposed on the second electrode layer.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
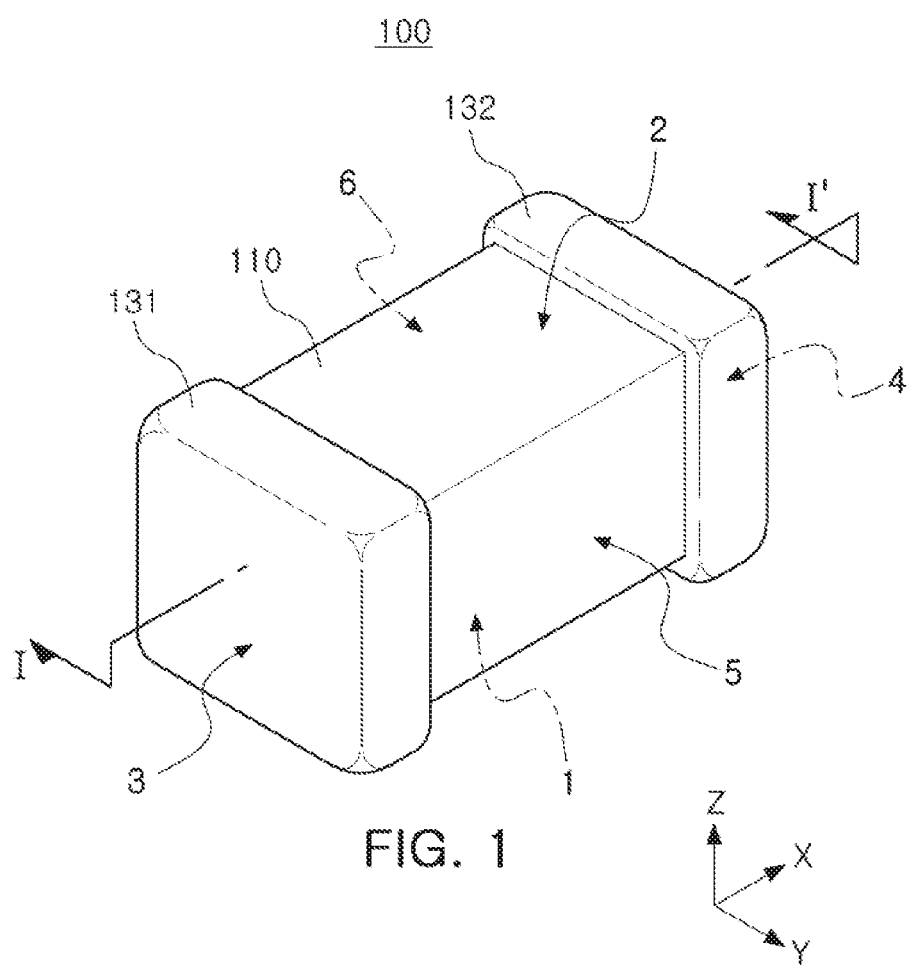
FIG. 1 is a schematic perspective view of a multilayer capacitor according to an exemplary embodiment in the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of the elements in the drawings can be exaggerated for clear description. Also, elements having the same function within the scope of the same concept represented in the drawing of each exemplary embodiment will be described using the same reference numeral.

In the drawings, certain elements may be omitted to more clearly describe the present disclosure, and to clearly express a plurality of layers and areas, thicknesses may be magnified. The same elements having the same function within the scope of the same concept will be described with use of the same reference numeral. Further, throughout the specification, it will be understood that when a part "includes" an element, it may further include another element, not excluding another element, unless otherwise indicated.

In the drawings, it will be understood that an X direction is a first direction or a length direction, that a Y direction is a second direction or a width direction, and that a Z direction is a third direction or a thickness direction or a layering direction, but are not limited thereto.

Multilayer Capacitor

Figure 2:
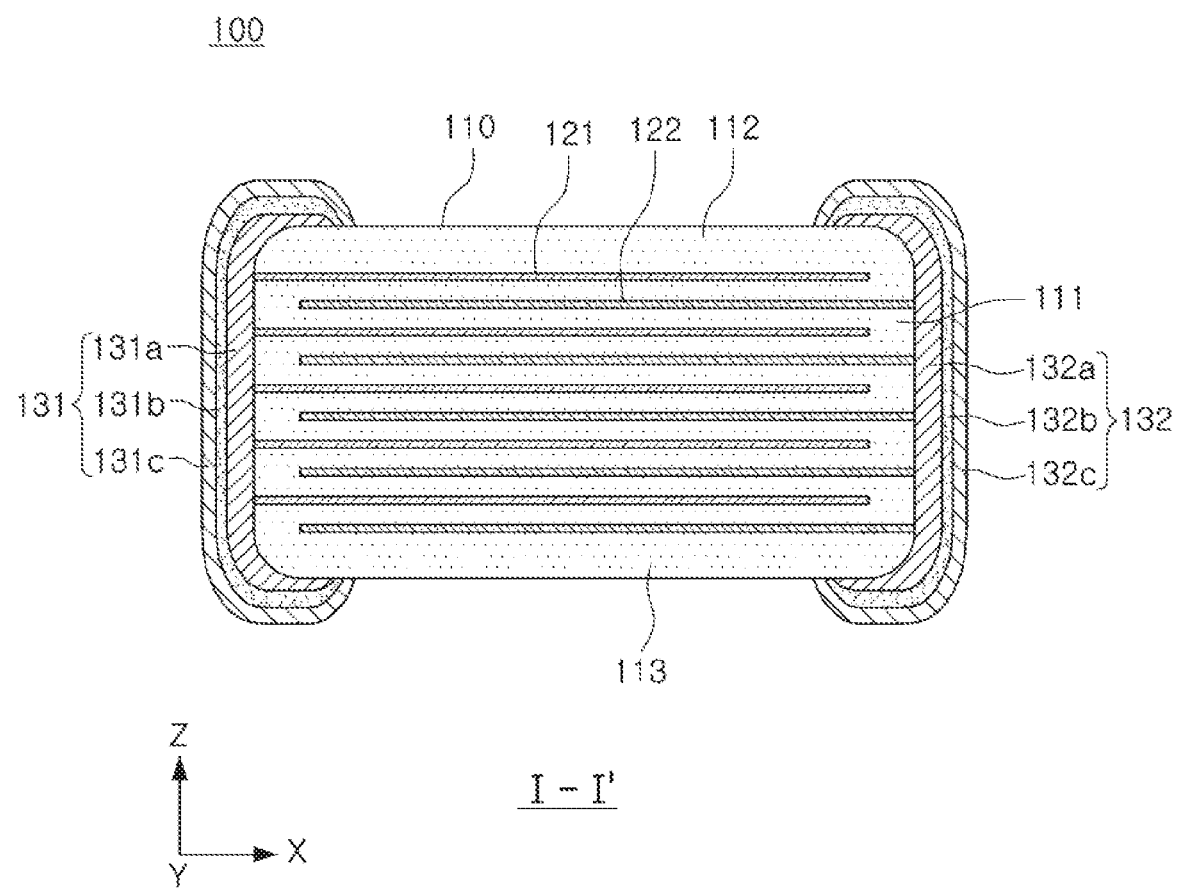
FIG. 2 is a cross-sectional view taken along line I-I' in FIG. 1.
Figure 3A:
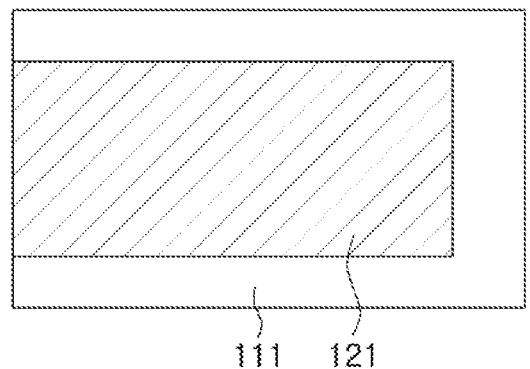
FIGS. 3A and 3B are views of a ceramic green sheet in which an internal electrode for manufacturing a body of a capacitor is printed according to an exemplary embodiment.
Figure 3B:
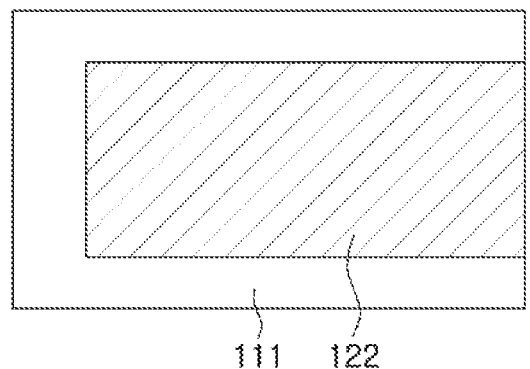

FIG. 1 is a schematic perspective view of a multilayer capacitor according to an exemplary embodiment in the present disclosure. FIG. 2 is a cross-sectional view taken along line I-I' in FIG. 1. FIGS. 3A and 3B are views of a ceramic green sheet in which an internal electrode for manufacturing a body of a capacitor is printed according to an exemplary embodiment.

Hereinafter, a multilayer capacitor 100 will be described with reference to FIGS. 1, 2, and 3 according to an exemplary embodiment.

Referring to FIG. 1, the multilayer capacitor 100 may include a body including internal electrodes 121 and 122 alternately disposed with a dielectric layer 111, and external electrodes 131 and 132 which are disposed on the body according to an exemplary embodiment.

The body 110 may be formed by layering the plurality of dielectric layers 111 and internal electrodes 121 and 122 in a thickness (Z) direction and being sintered, and the form, size and number of the dielectric layer 111 and internal electrodes 121 and 122 may not be limited to the illustrated exemplary embodiment.

The body 110 may have first and second surfaces 1 and 2 opposing each other in a thickness direction (a Z direction), third and fourth surfaces 3 and 4 connected to the first and second surfaces 1 and 2 and opposing each other in a length direction (an X direction), and fifth and sixth surfaces 5 and 6 connected to the first and second surfaces 1 and 2 and the third and fourth surfaces 3 and 4, and opposing each other in a width direction (a Y direction).

The plurality of dielectric layers 111 forming the body may be in a sintered state, and boundaries between adjacent dielectric layers 111 may be integrated, such that the boundaries may be difficult to identify without using a scanning electron microscope (SEM).

The type of material forming the dielectric layer 111 may not be particularly limited as long as sufficient capacitance is able to be obtained therewith. For example, the material may include barium titanate ($BaTiO_3$) power. As the material composing the dielectric layer 111, various ceramic additives, organic solvents, coupling agents, dispersing agents, and the like, may be further added to barium titanate ($BaTiO_3$) powder, or the like.

The upper and lower portions of the body 110 may include cover layers 112 and 113, respectively, formed by layering dielectric layers in which an internal electrode is not formed. The cover layers 112 and 113 may serve to maintain reliability of a multilayer capacitor against external impacts.

Referring to FIGS. 1 and 2, the body 110 may include the dielectric layer 111 and first and second internal electrodes 121 and 122, alternately exposed with the dielectric layer 111 interposed therebetween through the third and fourth surfaces 3 and 4.

The first and second internal electrodes 121 and 122 may be pairs of electrodes having different polarities, and may be insulated from each other electrically by the dielectric layer 111 interposed therebetween.

The first and second internal electrodes 121 and 122 may be alternately exposed to the third and fourth surfaces 3 and 4 in a length direction (direction X) of the body 110 to be connected to the first and second external electrodes 131 and 132.

The thickness of the first and second internal electrodes 121 and 122 may be determined depending on intended usage.

For example, the thickness of the first and second internal electrodes 121 and 122 may be determined to be within a range of 0.2 to 1.0 μm by considering the size of the body 110, but is not limited thereto.

The first and second internal electrodes 121 and 122 may include one of nickel (Ni), copper (Cu), palladium (Pd), silver (Ag), lead (Pb), or platinum (Pt), or alloys thereof, but are not limited thereto.

Referring to FIGS. 3A and 3B, the body may be formed by layering a ceramic green sheet (FIG. 3A) on which the first internal electrode 121 is printed and a ceramic green sheet (FIG. 3B) on which the second internal electrode 122 is printed, and being sintered.

The external electrodes 131 and 132 may be disposed on surfaces of the body, and may contact the internal electrodes 121 and 122. The external electrodes 131 and 132 may include the first and second external electrodes 131 and 132, connected to the first and second internal electrodes 121 and 122, respectively.

The external electrodes 131 and 132 may include first electrode layers 131a and 132a which are disposed on the body 110, oxide layers 131b and 132b which are disposed on the first electrode layers 131a and 132b and include a metal oxide and glass, and second electrode layers 131c and 132c which are formed on the oxide layers 131b and 132b.

The first electrode layers 131a and 132a may serve to electrically connect the internal electrodes 121 and 122 to the external electrodes 131 and 132. The method for forming the first electrode layers 131a and 132a may not be limited, and may be undertaken using a paste including a conductive metal and glass, or by sputtering, electroless plating, atomic layer disposition (ALD), or the like.

The first electrode layers 131a and 132a may include Ni. For example, the first electrode layers 131a and 132a may be a sintered electrode including a conductive metal and glass, and the conductive metal may be Ni. As described below, the metal oxide included in the oxide layers 131b and 132b may be an oxide of the metal included in the first electrode layers 131a and 132a, and as Ni is easily oxidized, the metal oxide may be easily provided to form the oxide layers 131b and 132b.

Also, by forming the conductive metal included in the first electrode layers 131a and 132a with the same material as that of the conductive metal included in the internal electrodes 121 and 122, the electrical connectivity between the internal electrodes 121 and 122 and the external electrodes 131 and 132 may be further improved. For example, the internal electrodes and the first external electrodes may be formed using a conductive paste including Ni, thereby further improving the electric connectivity between the internal electrodes and the external electrodes.

The oxide layers 131b and 132b may be formed between the first electrode layers 131a and 132a and the second electrode layers 131c and 132c according to an exemplary embodiment.

The oxide layers 131b and 132b may include a metal oxide and glass, and may be formed between the first electrode layers 131a and 132a and the second electrode layers 131c and 132c to prevent moisture from penetrating into the capacitor, thereby improving moisture resistance reliability.

A conventional external electrode implements sealing properties which prevent moisture, and the like, from penetrating into a capacitor, along with electric properties by using a metal and glass.

However, the metal and glass may not have sufficient sealing properties, since the metal and glass are secondary materials, and interfacial coherence between the materials may be weak, so that a space is created between the materials, and the space may become a route for moisture penetration, and moisture resistance reliability is degraded accordingly.

Accordingly, to secure moisture resistance reliability, there has been an attempt to improve moisture resistance reliability by forming a glass layer between electrode layers forming an external electrode. However, as the coherence between a glass layer and an electrode layer is also weak, a route for moisture penetration is created.

According to the present disclosure, the oxide layers 131b and 132b including a metal oxide and glass may be formed between the first electrode layers 131a and 132a and the second electrode layers 131c and 132c, thereby improving moisture resistance reliability.

As the interfacial coherence between a metal oxide and glass is high, the metal oxide may prevent the creation of a moisture penetration route, thereby improving moisture resistance reliability.

Meanwhile, the metal oxide of the oxide layers 131b and 132b may be formed by oxidization of the metal included in the first electrode layers 131a and 132a. By forming the metal oxide by oxidizing the first electrode layers 131a and 132a, the coherence between the first electrode layers 131a and 132a and the oxide layers may be sufficiently secured, thereby improving moisture resistance reliability.

For example, the first electrode layers 131a and 132a may include Ni, and the metal oxide of the oxide layers 131b and 132b may be a Ni oxide such as NiO, $Ni_2O_3$, or the like.

As the exemplary embodiment of forming the oxide layers 131b and 132b, the first electrode layers 131a and 132a may be formed using a paste including a conductive metal and glass in the body, and a metal oxide may be formed on the surface of the first electrode layers 131a and 132a by oxidizing the surface of the first electrode layers.

Then, the second electrode layers 131c and 132c may be formed by coating the surface of the first electrode layers 131a and 132a on which the metal oxide is formed with the paste including a conductive metal and glass, and being sintered. Accordingly, when being sintered, the glass material of the second electrode layers may move to the metal oxide, and the oxide layers 131b and 132b including metal oxide and glass may be formed.

Also, the thickness of the oxide layers 131b and 132b may be within a range of 0.2 to 8 μm.

In the case in which the thickness of the oxide layers 131b and 132b is less than 0.2 μm, moisture resistance reliability may degrade, and in the case in which the thickness is greater than 8 μm, the electrical connectivity between the first electrode layers and the second electrode layers may degrade.

Also, the content of a metal included in the oxide layers 131b and 132b may be within a range of 10 to 80 wt % compared to a total weight of the oxide layers. In this case, the metal content may refer to the metal comprising the metal oxide, and a non-oxide metal may be partially included.

In the case in which the metal content is less than 10 wt %, the coherence with glass may not be sufficiently secured as the content of a metal oxide is low, and accordingly, moisture resistance reliability may degrade. Also, in the case in which the oxide layers become even slightly thicker, the electric connectivity between the first and second electrode layers may degrade.

However, in the case in which the metal content is higher than 80 wt %, the glass content decreases, and accordingly, moisture resistance reliability may be degraded.

The second electrode layers 131c and 132c may be formed on the oxide layers. The second electrode layers 131c and 132c may serve to improve bonding strength with a plating layer or to improve connectivity with a pad when being mounted.

In this case, the second electrode layers 131c and 132c may be a sintered electrode including a conductive metal and glass. As the second electrode layers 131c and 132c are formed by coating with a paste including a conductive metal and glass and being sintered, the glass component may move to the metal oxide and form the oxide layers 131b and 132b including the metal oxide and glass during being sintered, thereby improving moisture resistance reliability.

Also, the type of a conductive metal included in the second electrode layer may not be limited. For example, the conductive metal may be Cu.

Meanwhile, a plating layer may be additionally formed on the second electrode layers 131c and 132c. For example, a Ni-plated layer or a Sn-plated layer may be formed on the second electrode layers 131c and 132c, and the Ni-plated layer and the Sn-plated layer may be formed sequentially.

Embodiment

To manufacture a sample chip, the first electrode layer was formed by coating a ceramic body with a paste including Ni and glass, and a Ni oxide was formed on the surface of the first electrode layer by oxidizing the surface of the first electrode layer. Then, the second electrode layer and the oxide layer were formed by coating the Ni oxide with a paste including Cu and glass, and being sintered.

After manufacturing a sample chip while changing the metal content and thickness of the oxide layer formed between the first electrode layer and the second electrode layer, moisture resistance reliability and internal and external electrodes contact were evaluated and are provided in Table 1.

Moisture resistance reliability was tested by applying a voltage of 9.5V under conditions of 85° C. and 85% for twenty hours, and the number of reliability defect occurrences of after testing four hundred cases in each sample is provided.

As for the internal and external electrodes contact, whether the internal electrode and the external electrode are electrically connected was tested, and the number of electrical connection defects after testing one hundred cases in each sample is provided. In the test, as sample chips were manufactured while only the metal content and thickness of the oxide layer were changed, in the case in which the electric connection was defective, it was determined that the electric connection of the first electrode layer and the second electrode layer was defective.

TABLE 1

| Sample No. | Oxide layer | | Moisture resistance reliability defect | Internal and external electrodes contact defect |
|---|---|---|---|---|
| | Metal content (weight %) | Thickness (μm) | | |
| 1 | 5% | 0.1 | 8/400 | 0/100 |
| 2 | 5% | 0.4 | 3/400 | 0/100 |
| 3 | 5% | 4 | 1/400 | 0/100 |
| 4 | 5% | 8 | 0/400 | 1/100 |
| 5 | 5% | 10 | 0/400 | 60/100 |
| 6 | 20% | 0.1 | 4/400 | 0/100 |
| 7 | 20% | 0.4 | 0/400 | 0/100 |
| 8 | 20% | 4 | 0/400 | 0/100 |
| 9 | 20% | 8 | 0/400 | 0/100 |
| 10 | 20% | 10 | 0/400 | 48/100 |
| 11 | 70% | 0.1 | 2/400 | 0/100 |
| 12 | 70% | 0.4 | 0/400 | 0/100 |
| 13 | 70% | 4 | 0/400 | 0/100 |
| 14 | 70% | 8 | 0/400 | 0/100 |
| 15 | 70% | 10 | 0/400 | 67/100 |

As shown in samples No. 1, 2, 3, 4, and 5, in the case in which the metal content of the oxide layer was less than 10%, reliability was degraded or internal and external electrode contact was degraded.

Even in the case in which the metal content of the oxide layer was higher than 10%, the moisture resistance reliability was degraded in samples No. 6 and 11 in which the thickness was less than 0.2 μm as interfacial bonding strength was not sufficiently secured.

Even in the case in which the metal content was higher than 10%, the internal and external electrodes contact degraded in samples No. 10 and 15 in which the oxide layer was too thick, the thickness of which is greater than 8 μm.

However, the moisture resistance reliability and the internal and external electrodes contact turned out to be excellent in samples No. 7, 8, and 9 and 12, 13, and 14 which satisfied the metal content and thickness of the oxide layer range suggested by the present disclosure.

According to an exemplary embodiment, the multilayer capacitor may include an oxide layer including a metal oxide and glass in an external electrode, thereby improving moisture resistance reliability.

While the exemplary embodiments have been shown and described above, it will be apparent to those skilled in the art that modifications and variations could be made without departing from the scope of the present invention as defined by the appended claims.

What is claimed is:

1. A multilayer capacitor comprising:
a body including an internal electrode alternately disposed with a dielectric layer; and
an external electrode disposed on the body,
wherein the external electrode includes a first electrode layer contacting the internal electrode, a glass-oxide composite layer disposed on the first electrode layer and including a metal oxide and glass, and a second electrode layer disposed on the glass-oxide composite layer, and
the glass-oxide composite layer, including the metal oxide and the glass and spaced apart from the internal electrode by the first electrode layer, has a thickness within a range from 0.2 μm or more to 8 μm or less.

2. The multilayer capacitor of claim 1, wherein a content of a metal included in the glass-oxide composite layer is within a range of 10 wt % to 80 wt %, based on a total weight of the glass-oxide composite layer.

3. The multilayer capacitor of claim 1, wherein the first electrode layer comprises nickel (Ni).

4. The multilayer capacitor of claim 1, wherein the second electrode layer is a sintered electrode including a conductive metal and glass.

5. The multilayer capacitor of claim 4, wherein the conductive metal is copper (Cu).

6. The multilayer capacitor of claim 1, wherein the metal oxide is a nickel (Ni) oxide.

7. The multilayer capacitor of claim 1, wherein the first electrode layer comprises nickel (Ni), the metal oxide is a nickel (Ni) oxide, and the second electrode layer is a sintered electrode including copper (Cu) and glass.

8. The multilayer capacitor of claim 1, wherein the metal oxide is an oxide of a metal contained in the first electrode layer.

9. The multilayer capacitor of claim 1, further comprising a plating layer disposed on the second electrode layer.

10. The multilayer capacitor of claim 1, wherein the second electrode layer includes a conductive metal different from a metal of the metal oxide of the glass-oxide composite layer.

* * * * *